United States Patent [19]

Mayer et al.

[11] Patent Number: 5,432,701
[45] Date of Patent: Jul. 11, 1995

[54] ELECTRONIC SYSTEM IN A MOTOR VEHICLE FOR DETECTING A ROUGH ROAD CONDITION

[75] Inventors: Rudi Mayer, Vaihingen/Enz; Klaus Ries-Muller, Bad Rappenau, both of Germany

[73] Assignee: Robert Bosch GmbH, Stuttgart, Germany

[21] Appl. No.: 210,104

[22] Filed: Mar. 16, 1994

Related U.S. Application Data

[63] Continuation of Ser. No. 865,998, Apr. 9, 1992, abandoned.

[30] Foreign Application Priority Data

May 8, 1991 [DE] Germany ............. 41 15 032.5

[51] Int. Cl.6 .................................. G01B 13/22
[52] U.S. Cl. ................... 364/431.01; 364/424.05; 364/431.05; 280/707; 280/708; 73/118.2; 123/478; 123/488; 123/492
[58] Field of Search .............. 364/431.01–431.11, 364/424.05, 426.01, 551, 571.01, 571.07; 280/702, 707, 708, 688; 73/118.2, 118.3, 117.3, 204; 123/478, 65 R, 494, 488, 492, 422, 489, 440, 46 R

[56] References Cited

U.S. PATENT DOCUMENTS

| | | | |
|---|---|---|---|
| 4,418,568 | 12/1983 | Surman | 73/202 |
| 4,571,990 | 2/1986 | Hönig | 73/118 |
| 4,665,703 | 5/1987 | David | 123/46 R |
| 4,720,790 | 1/1988 | Miki et al. | 364/424 |
| 4,787,650 | 11/1988 | Doi et al. | 280/707 |
| 4,986,243 | 1/1991 | Weissler, II et al. | 123/488 |
| 4,995,258 | 2/1991 | Frank | 73/118.2 |
| 4,999,781 | 3/1991 | Holl et al. | 364/431.05 |
| 5,001,643 | 3/1991 | Domino et al. | 364/431.06 |
| 5,071,159 | 12/1991 | Kamimura et al. | 280/707 |
| 5,119,672 | 6/1992 | Pfeiffer et al. | 73/118.2 |
| 5,125,293 | 6/1992 | Takizawa | 74/866 |
| 5,276,624 | 1/1994 | Ito et al. | 364/426.01 |

FOREIGN PATENT DOCUMENTS

| | | |
|---|---|---|
| 2746837 | 4/1979 | Germany . |
| 3610186 | 10/1987 | Germany . |
| 3827737 | 3/1989 | Germany . |
| 4100527 | 7/1992 | Germany . |

*Primary Examiner*—Kevin J. Teska
*Assistant Examiner*—Jacques H. Louis-Jacques
*Attorney, Agent, or Firm*—Kenyon & Kenyon

[57] ABSTRACT

A system and method for generating a signal which indicates whether a motor vehicle containing such a system is operating on a rough road surface. The generated signal is based on the signals output by a sensor that measures the air-mass flow rate through the air-intake manifold of an internal-combustion engine. The system and method use the differences in the signals output by the sensor when on a smooth road surface and a rough road surface to generate the signal indicative of a rough road surface. The rough road indication signal can be applied, inter alia, to engine misfire detection, anti-lock braking control, and vehicle chassis regulation.

36 Claims, 3 Drawing Sheets

ELECTRONIC SYSTEM IN A MOTOR VEHICLE FOR DETECTING A ROUGH ROAD CONDITION

This is a continuation of application Ser. No. 07/865,998 filed on Apr. 9, 1992 now abandoned.

TECHNICAL FIELD

The invention relates to systems and methods for detecting the condition of a road surface upon which a motor vehicle travels. More specifically, it relates to systems that detect a rough road condition from the effect such a condition has on air flow in the air-intake apparatus of an internal-combustion engine.

BACKGROUND OF THE INVENTION

Several systems for detecting rough road surfaces are known in the automotive technology.

According to the German Patent Application No. 38 27 737, entitled a Device for Generating an Indicating and/or a Control Signal, the use of the device disclosed therein makes it possible "to recognize and signal critical changes in the road-surface covering with relatively little time delay" (col. 3, lines 57–60). To this end, signals which are primarily used to regulate the automobile chassis are processed accordingly.

The German Patent Application No. 36 10 186 concerns an anti-lock braking (ABS) control system. Since known ABS control systems monitor wheel-speed signals to regulate braking pressure, it is important that wheel speed patterns caused by a rough road surface are not mistaken for lock-up tendencies of the individual wheels caused by braking.

In known applications involving the monitoring of exhaust gas from internal-combustion engines, detection of misfirings is critical. A misfiring occurs when the air-fuel mixture in a combustion chamber of an internal-combustion engine is either partially burned or not burned at all. As a result, pollutant-containing exhaust gases are produced.

Since misfirings in an internal-combustion engine cause short-term drops in the engine's rotational speed, such misfirings can be detected by monitoring the speed of the engine for fluctuations characteristic of misfirings. Once a misfiring has been detected, measures can be taken to limit the exhaust pollutant emissions. German Patent No. 41 00 527 (R. 24099) entitled A Method and Device for Determining Misfirings in an Internal-Combustion Engine discloses and clarifies the difficulties that such misfirings entail. If engine speed is used to detect misfirings, measures need to be taken to avoid misinterpreting a rough road condition as a misfiring since both will effect engine speed in a similar manner. The present invention provides a system that solves the problem of detecting rough road conditions without the problems identified in the prior art.

SUMMARY OF THE INVENTION

The present invention provides a system for detecting the condition of the road over which an automobile is traveling. The system of the present invention is implemented using apparatus that exists in a typical motor vehicle.

The operation of the system of the present invention is based on the effect a rough road condition has on the air-mass flow rate in the air-intake manifold of an internal-combustion engine. When a motor vehicle is driven over a rough road surface, such a road surface will cause fluctuations in the air-mass flow rate that are more pronounced than those when driving over a smooth road surface.

It is common for internal-combustion engines to have air-mass flow rate sensors in their air-intake manifolds for engine-regulating purposes.

The system of the present invention processes the signal output from the air-mass flow rate sensor and generates an output signal which indicates whether the motor vehicle is traversing a rough road surface. The output signal can be used by any systems in the motor vehicle which require indication of a rough road condition or it may be used to directly actuate a particular component.

The present invention uses a signal that is typically available in many motor vehicles, so no additional or special sensors are required to practice the present invention. Moreover, the signal processing that is performed by the system of the present invention is well-suited for microprocessor-based implementation.

The present invention will be described in detail in the remainder of the specification referring to the drawings.

DETAILED DESCRIPTION OF THE DRAWINGS

Figure 1:
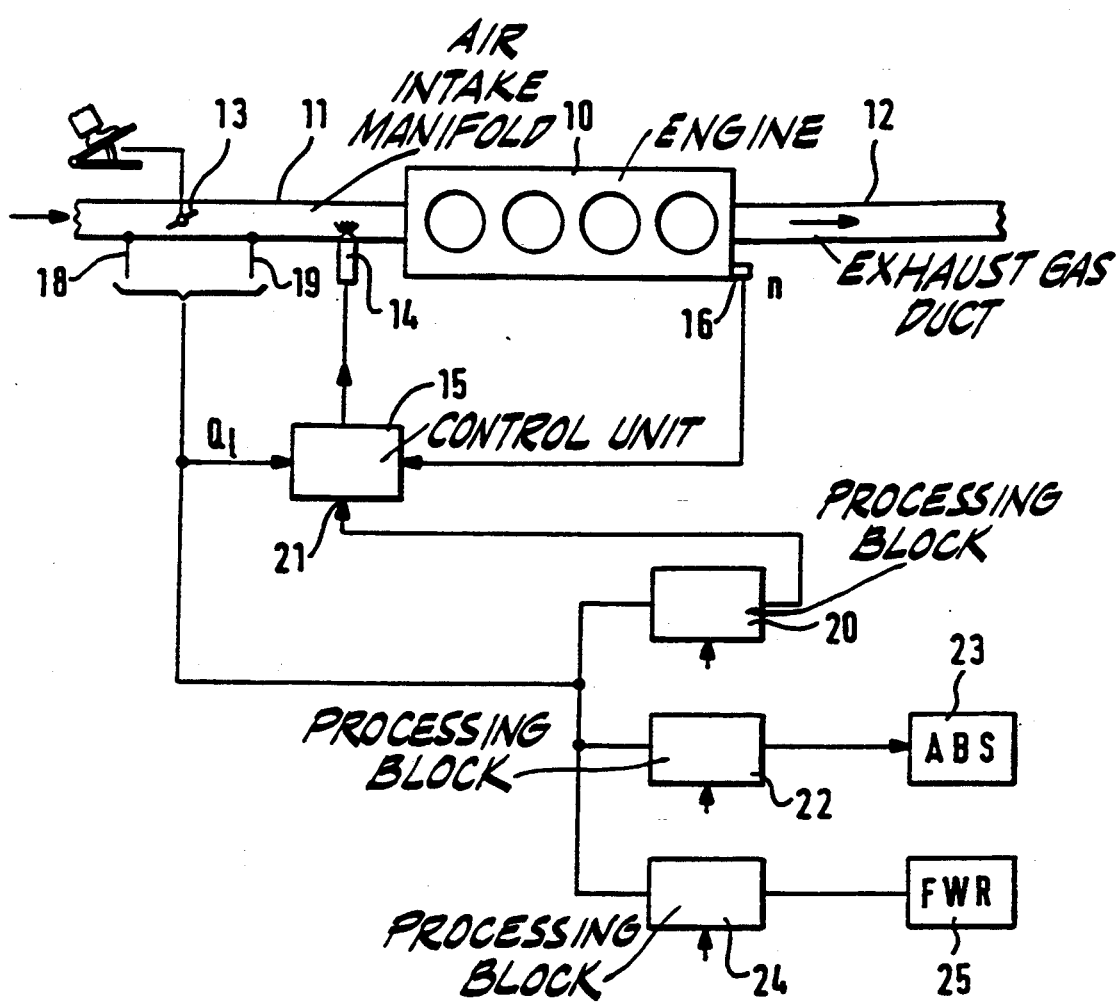
FIG. 1 shows a motor vehicle control system that incorporates the present invention.

FIG. 1 shows the various components and functional blocks of a typical motor vehicle which incorporates the system of the present invention. Referring to FIG. 1, internal-combustion engine 10 is shown. Also shown are the engine air-intake manifold 11 and exhaust-gas duct 12 that are associated with engine 10. Throttle valve 13 is situated in air-intake manifold 11, as is a fuel-metering system, of which only fuel injection valve 14 is shown. Fuel injection valve 14 is triggered by control unit 15. Control unit 15, in addition to receiving a speed signal from speed sensor 16, receives load signal $Q_1$ which indicates the conditions within air-intake manifold 11 of internal-combustion engine 10.

$Q_1$ is generated by sensor 18 or 19. Sensor 18 is either a hot-wire or hot-film air-mass sensor situated within air-intake manifold 11 in front or upstream of throttle valve 13. Sensor 19 is a pressure sensor situated within air-intake manifold 11 behind, or downstream of, throttle valve 13. Both types of sensors provide an electrical signal which is indicative of the air-flow rate in air-intake manifold 11. Only one or the other is required according to the system of the present invention.

In accordance with the present invention, $Q_1$, can be processed to determine a rough road condition for use in several automotive applications. Referring to FIG. 1, block 20 can be used to process $Q_1$ for the purpose of misfire detection. Block 20 processes $Q_1$, in addition to other signals, and generates a signal which is received by control unit 15 through input 21. Control unit 15 controls the fuel metering by actuating the fuel injection valves 14 accordingly. Block 22 processes $Q_1$ to detect a rough road surface in connection with ABS control unit 23. Block 24 processes $Q_1$ to detect a rough road surface in connection with chassis-regulating system 25.

The various systems depicted in FIG. 1 are known in the prior art, with the exception of the rough road surface detection. Electronically controlled fuel injection systems, as well as ABS systems, have been part of the automotive technology for quite some time. One skilled in the art would likewise be familiar with chassis-regulating systems.

Figure 2:
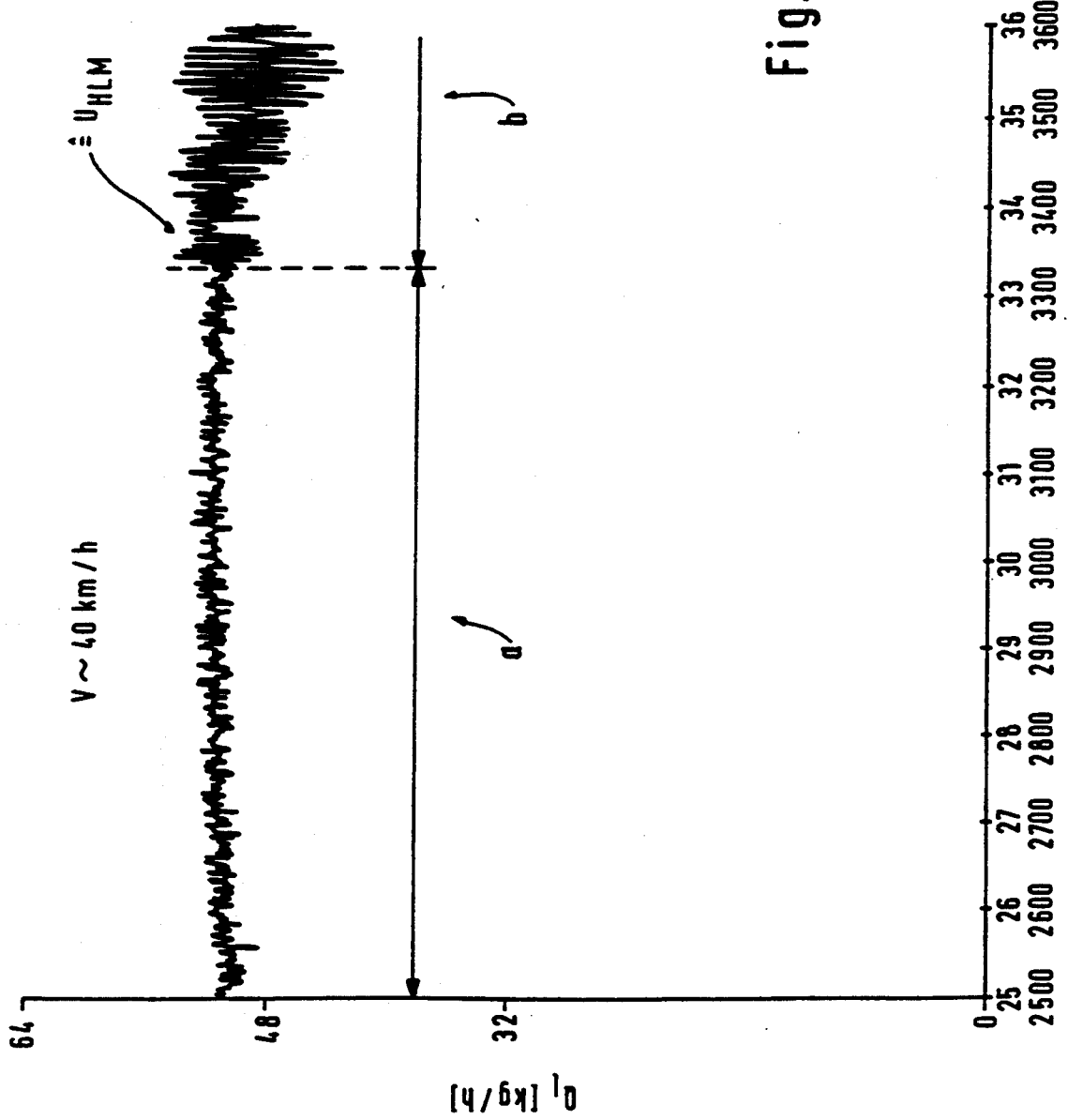
FIG. 2 is a graph of the air-mass rate of flow through the air-intake of an internal-combustion engine for smooth and rough road surfaces.

The present invention is based on the recognition that a rough road surface affects the air-mass rate of flow in the air-intake apparatus of an internal-combustion engine. This effect is apparent in the graph shown in FIG. 2. On this graph, the air-mass rate of flow in air-intake manifold 11 is plotted over time during a first driving segment a on a smooth road surface, as well as during a subsequent driving segment b on a rough road surface. The effect of the road surface roughness on the air-mass rate of flow is readily discernible. As can be seen in FIG. 2, fluctuations in the air-mass rate of flow are negligible during travel on a smooth road surface. Such minor fluctuations are attributable to the alternating opening and closing of the intake valves and possibly to manifestations of resonance in air-intake manifold 11. During travel on a rough road surface, however, the fluctuations in the air-mass flow rate are markedly more pronounced. Recognizing this distinction, it is possible to process the signal of the air-mass flow sensor 18 or the air pressure sensor 19, and to generate a corresponding output signal that indicates whether the surface being traversed is rough or not. That signal could then be utilized by other systems in the motor vehicle as required.

Figure 3:
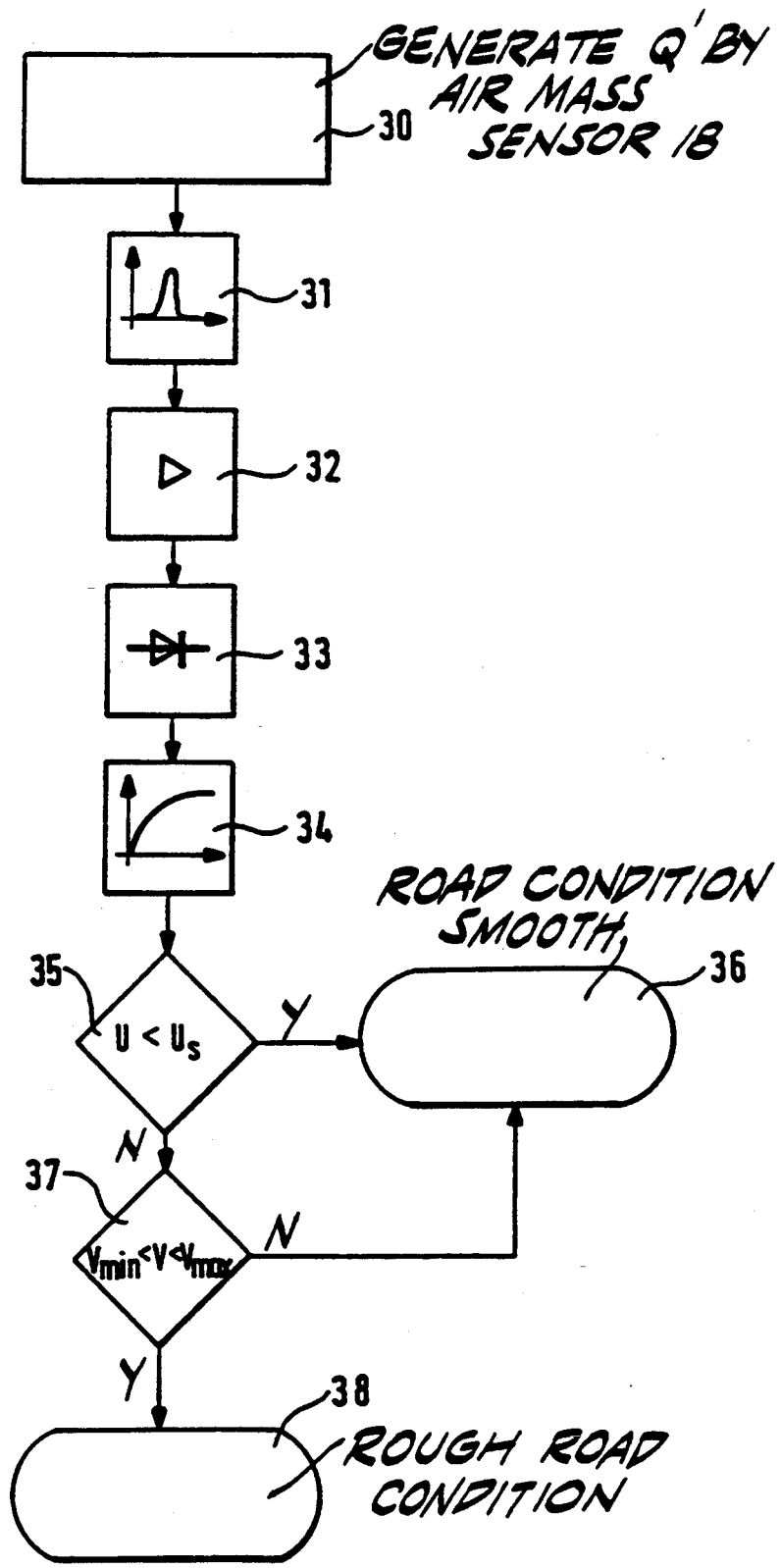
FIG. 3 is a flow chart of the signal processing involved in detecting a rough road condition.

FIG. 3 shows a representative flow chart of the processing performed upon the air-intake signal $Q_1$ for determining rough road conditions. Block 30 represents the generation of $Q_1$ by hot-wire air-mass sensor 18 (FIG. 1). The sensor output is then passed through a band-pass filter, represented by step 31. The filtered signal is then amplified at step 32 and rectified at step 33. The rectified signal is passed through a low-pass filter at step 34. The low pass filter output is then compared at step 35 with a predetermined threshold value, $U_s$. If the low-pass filter output does not exceed $U_s$, the road condition in question is deemed to be smooth, as represented by the block at step 36. As such, no rough road indication signal is generated. If the low-pass filter output exceeds $U_s$, the road condition in question is deemed to be rough. Once this determination is made, the velocity of the motor vehicle, V, is sampled at step 37 to determine whether it falls within a specified range of velocities between $V_{min}$ and $V_{max}$. This is the range of velocities over which rough road surface detection is effectively possible. If the vehicle's velocity is not within this range, no rough road indication signal is generated, as in the case of a smooth road condition at the block at step 36. If the vehicle's velocity is within the range, a rough road indication signal is generated at the block at step 38. The rough road indication signal can be used either to directly control a particular component or as an input to the various systems within the motor vehicle such as fuel injection controller 15, ABS system 23, or chassis-regulating system 25.

Since each system may have special signal processing requirements depending upon its function, in FIG. 1 blocks 20, 22, and 24 are drawn separately and each shown with an additional input. These inputs represent other signals that each block may need to process in conjunction with $Q_1$ in order to carry out its particular function. Typical signals include signals representing vehicle velocity, temperature, steering-angle, and other such signals.

Although FIGS. 2 and 3 are based on air-mass flow rate as sensed by hot-wire air-mass sensor 18, in principle, the air-mass rate of flow in air-intake manifold 11 can also be sensed, as is known, using, for example, pressure sensor 19 located behind, or downstream of, throttle valve 13. With any type of air-mass flow rate sensor that may be used, its particular features must be considered and its signal output processed accordingly. Relating to this, in particular, are manifestations of resonance of the air-mass flow current.

The terms and expressions which are employed herein are used as terms of expression and not of limitation. There is no intention, in the use of such terms and expressions, of excluding the equivalents of the features shown, and described, or portions thereof, it being recognized that various modifications are possible within the scope of the invention.

What is claimed:

1. A system for generating a signal indicative of a rough road condition, comprising:
    an air flow rate sensor for generating a first parameter signal indicative of an instantaneous condition of a first parameter being measured in an air intake means of an internal combustion engine, the air flow rate sensor generating at least a first type of signal when a first condition exists and a second type of signal when a second condition exists;
    signal processing means for processing the first parameter signal such that a processed first parameter signal accentuates at least a difference in the first and second types of signals; and
    a comparator means for comparing the processed first parameter signal with a predetermined comparison value and generating a first signal indicative of other than a rough road condition when the processed first parameter signal has a first relationship with the predetermined comparison value and a second signal indicative of a rough road condition when the processed first parameter signal has a second relationship with the predetermined comparison value.

2. The system as recited in claim 1, wherein the air flow rate sensor measures an air-mass rate of flow.

3. The system as recited in claim 2, wherein the air-mass flow sensor includes a hot-wire air mass sensor.

4. The system as recited in claim 2, wherein the air-mass flow sensor includes a hot-film air mass sensor.

5. The system as recited in claim 2, wherein the air-mass flow sensor includes a pressure sensor.

6. The system as recited in claim 1, wherein the signal processing means include filter means, amplifier means, and rectifier means.

7. The system as recited in claim 6, wherein the filter means includes a bandpass filter and a low-pass filter.

8. The system as recited in claim 6, wherein the first parameter signal is input to the bandpass filter, an output of the bandpass filter is input to the amplifier means, an output of the amplifier means is input to the rectifier means, an output of the rectifier means is input to the low-pass filter, an output of the low-pass filter which is the processed first parameter signal is input to the comparator means.

9. The system as recited in claim 1, wherein the first signal indicative of other than a rough road is indicative of a smooth road condition.

10. The system as recited in claim 1, wherein the comparator means further comprises a first comparator and a second comparator.

11. The system as recited in claim 10, wherein the first comparator generates the first signal indicative of other than the rough road condition when the processed first parameter signal has the first relationship with the predetermined comparison value.

12. The system as recited in claim 10, wherein the first comparator outputs a predetermined signal to the second comparator when the processed first parameter signal has the second relationship with the predetermined comparison value.

13. The system as recited in claim 12, wherein the second comparator outputs the second signal indicative of the rough road condition when a second parameter is within a predetermined range.

14. The system as recited in claim 13, wherein the second parameter is velocity of a motor vehicle being evaluated for operating in a rough road condition.

15. The system as recited in claim 12, wherein the second comparator outputs the first signal indicative of other than the rough road condition when a second parameter is outside of a predetermined range.

16. The system as recited in claim 15, wherein the second parameter is velocity of a motor vehicle being evaluated for operating in a rough road condition.

17. The system as recited in claim 1, wherein the air flow rate sensor measures an air-volume rate of flow.

18. A method for generating a signal indicative of a rough road condition, comprising the steps of:
   (a) generating with an air flow rate sensor a first parameter signal indicative of an instantaneous condition of a first parameter being measured in an air intake means of an internal combustion engine, the air flow rate sensor generating at least a first type of signal when a first condition exists and a second type of signal when a second condition exists;
   (b) processing the first parameter signal with signal processing means such that a processed first parameter signal accentuates at least a difference in the first and second types of signals; and
   (c) comparing with comparator means an output of the signal processing means with a predetermined comparison value and generating a first signal indicative of other than a rough road condition when the output has a first relationship with the predetermined comparison value and a second signal indicative of a rough road condition when the output has a second relationship with the predetermined comparison value.

19. The method as recited in claim 18, wherein the first parameter is an air-mass rate of flow.

20. The method as recited in claim 19, wherein step (a) includes measuring the air-mass flow rate with a hot-wire air mass sensor.

21. The method as recited in claim 19, wherein step (a) includes measuring the air-mass flow rate with a hot-film air mass sensor.

22. The method as recited in claim 19, wherein step (a) includes measuring the air-mass flow rate with a pressure sensor.

23. The method as recited in claim 18, wherein step (b) further comprises filtering, amplifying, and rectifying the first parameter signal.

24. The method as recited in claim 23, wherein filtering includes processing the first parameter signal with at least a bandpass filter and a low-pass filter.

25. The method as recited in claim 24, wherein step (b) further comprises:
   (1) bandpass filtering the first parameter signal;
   (2) amplifying the bandpass filtered first parameter signal;
   (3) rectifying the bandpass filtered and amplified first parameter signal; and
   (4) low-pass filtering the bandpass filtered, amplified, and rectified first parameter signal which is the processed first parameter signal.

26. The method as recited in claim 18, wherein the first signal indicative of other than a rough road is indicative of a smooth road condition.

27. The method as recited in claim 18, wherein step (c) further comprises comparing with a first comparator and a second comparator.

28. The method as recited in claim 27, wherein step (c) includes generating with the first comparator the first signal indicative of other than the rough road condition when the processed first parameter signal has the first relationship with the predetermined comparison value.

29. The method as recited in claim 27, wherein step (c) includes generating with the first comparator a predetermined signal for input to the second comparator when the processed first parameter signal has the second relationship with the predetermined comparison value.

30. The method as recited in claim 29, wherein step (c) includes generating with the second comparator the second signal indicative of the rough road condition when a second parameter is within a predetermined range.

31. The method as recited in claim 30, wherein the second parameter is velocity of a motor vehicle being evaluated for operating in a rough road condition.

32. The method as recited in claim 29, wherein step (c) includes generating with the second comparator the first signal indicative of other than the rough road condition when a second parameter is outside of a predetermined range.

33. The method as recited in claim 32, wherein the second parameter is velocity of a motor vehicle being evaluated for operating in a rough road condition.

34. The method as recited in claim 18, wherein the first parameter is an air-volume rate of flow.

35. A system for detecting a rough condition, comprising:
   an air flow rate sensor for generating a parameter signal indicative of an instantaneous condition of a parameter being measured in an air intake manifold of an internal combustion engine, the parameter signal being of a first type when a first condition exists and of a second type when a second condition exists; and
   a comparator for comparing the parameter signal with a predetermined comparison value and generating a first signal indicative of other than a rough road condition when the parameter signal has a first relationship with the predetermined comparison value and a second signal indicative of a rough road condition when the parameter signal has a second relationship with the predetermined comparison value.

36. A method for detecting a rough road condition, comprising the steps of:
(a) generating with an air flow rate sensor a parameter signal indicative of an instantaneous condition of a parameter being measured in an air intake manifold of an internal combustion engine, the parameter signal being of a first type when a first condition exists and of a second type when a second condition exists; and
(b) comparing the parameter signal with a predetermined comparison value and generating a first signal indicative of other than a rough road condition when the parameter signal has a first relationship with the predetermined comparison value and a second signal indicative of a rough road condition when the parameter signal has a second relationship with the predetermined comparison value.

* * * * *

UNITED STATES PATENT AND TRADEMARK OFFICE
CERTIFICATE OF CORRECTION

PATENT NO. : 5,432,701
DATED : July 11, 1995
INVENTOR(S) : Rudi Mayer, et al

It is certified that error appears in the above-indentified patent and that said Letters Patent is hereby corrected as shown below:

Column 6, line 53, "rough condition" should be --rough road condition--.

Signed and Sealed this

Twelfth Day of December, 1995

Attest:

BRUCE LEHMAN

*Attesting Officer*      *Commissioner of Patents and Trademarks*